(12) United States Patent
Cox

(10) Patent No.: US 6,734,579 B1
(45) Date of Patent: May 11, 2004

(54) SYSTEM AND METHOD FOR ACTIVATING A FIRST DEVICE FROM A SECOND DEVICE

(75) Inventor: Keith A. Cox, Campbell, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 10/202,781

(22) Filed: Jul. 24, 2002

(51) Int. Cl.⁷ .................................................. H02J 1/00
(52) U.S. Cl. ......................................... 307/38; 307/116
(58) Field of Search ............................. 307/38, 39, 115, 307/116; 701/1, 7, 8; 370/359, 360; 713/310, 330

(56) References Cited

U.S. PATENT DOCUMENTS

| | | | | |
|---|---|---|---|---|
| 5,717,957 A | * | 2/1998 | Lin ............................. | 710/72 |
| 5,787,299 A | * | 7/1998 | Ostler et al. .................. | 712/39 |
| 5,794,014 A | * | 8/1998 | Shetty et al. ................. | 703/25 |
| 5,842,027 A | * | 11/1998 | Oprescu et al. ............. | 713/300 |
| 5,884,086 A | * | 3/1999 | Amoni et al. ................ | 713/300 |
| 5,964,850 A | * | 10/1999 | Castell et al. ................. | 710/14 |
| 6,134,607 A | * | 10/2000 | Frink .......................... | 710/22 |
| 6,191,995 B1 | * | 2/2001 | Huber et al. ............ | 365/230.01 |
| 6,232,678 B1 | * | 5/2001 | Murata ........................ | 307/130 |
| 6,239,288 B1 | * | 5/2001 | Purchase et al. ............ | 548/469 |
| 6,240,520 B1 | * | 5/2001 | Cha ............................ | 713/310 |
| 6,311,245 B1 | * | 10/2001 | Klein ........................... | 710/306 |
| 6,439,916 B1 | * | 8/2002 | Kuo ............................ | 439/362 |
| 6,483,183 B1 | * | 11/2002 | Fink et al. ................... | 257/697 |
| 6,483,444 B2 | * | 11/2002 | Hoffman et al. ............ | 340/999 |
| 6,532,500 B1 | * | 3/2003 | Li et al. ........................ | 710/15 |
| 6,586,849 B2 | * | 7/2003 | Tarr ............................. | 307/38 |

* cited by examiner

*Primary Examiner*—Gregory J. Toatley, Jr.
*Assistant Examiner*—Sharon A. Polk
(74) *Attorney, Agent, or Firm*—Simon & Koerner LLP; Nancy R. Simon

(57) ABSTRACT

A signaling circuit may be implemented with a connection comprised of signal lines having predefined signals and/or functions. The predefined signals and/or functions may be defined by an individual entity or standards organization. The signaling circuit transmits information not included in the predefined signals and/or functions. The information may be transmitted from a second device, such as a visual display screen, to a first device, such as a computing device, using at least one signal line in the connection. The information may include information about the state or status of the second device. The signaling circuit may, for example, activate, or turn on, the first device when a switch associated with the second device is depressed. Once the first device is activated, the signaling circuit may be disabled in order to allow the at least one signal line to be used for its predefined function.

31 Claims, 11 Drawing Sheets

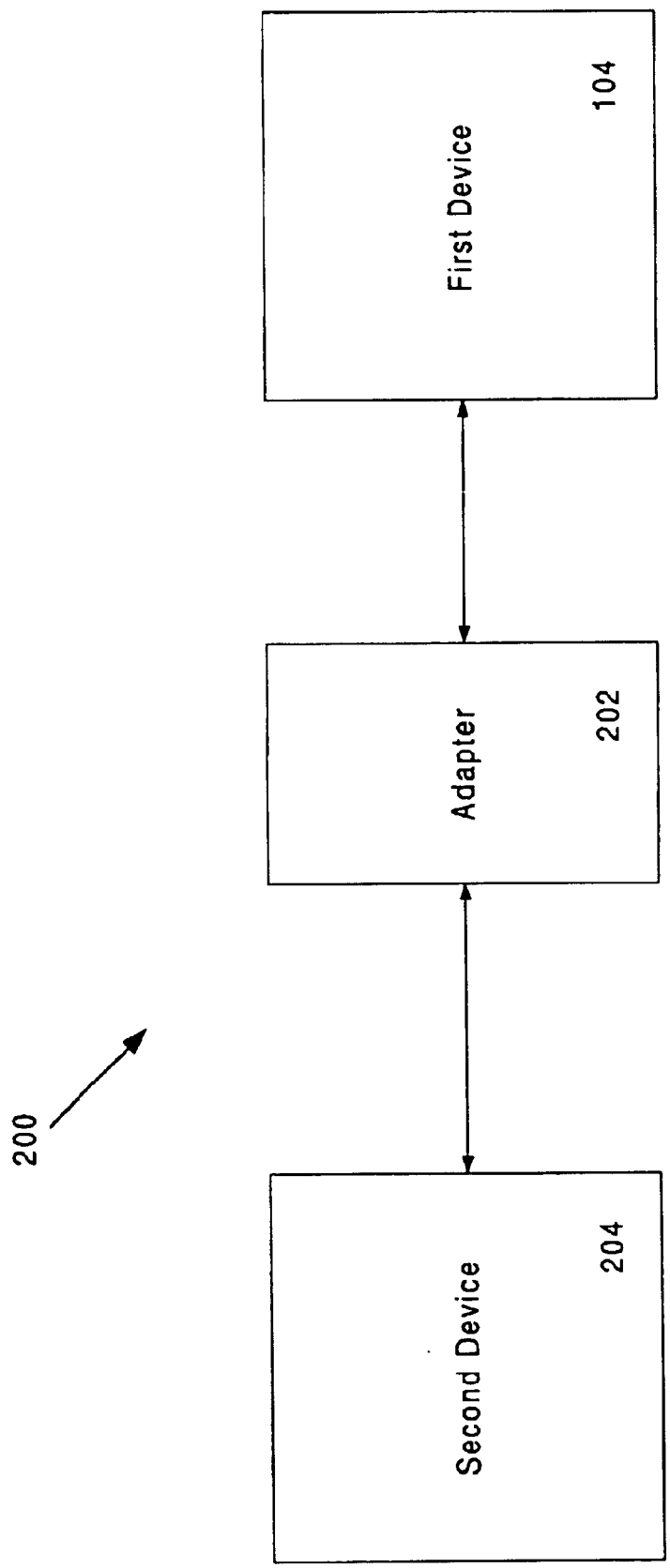

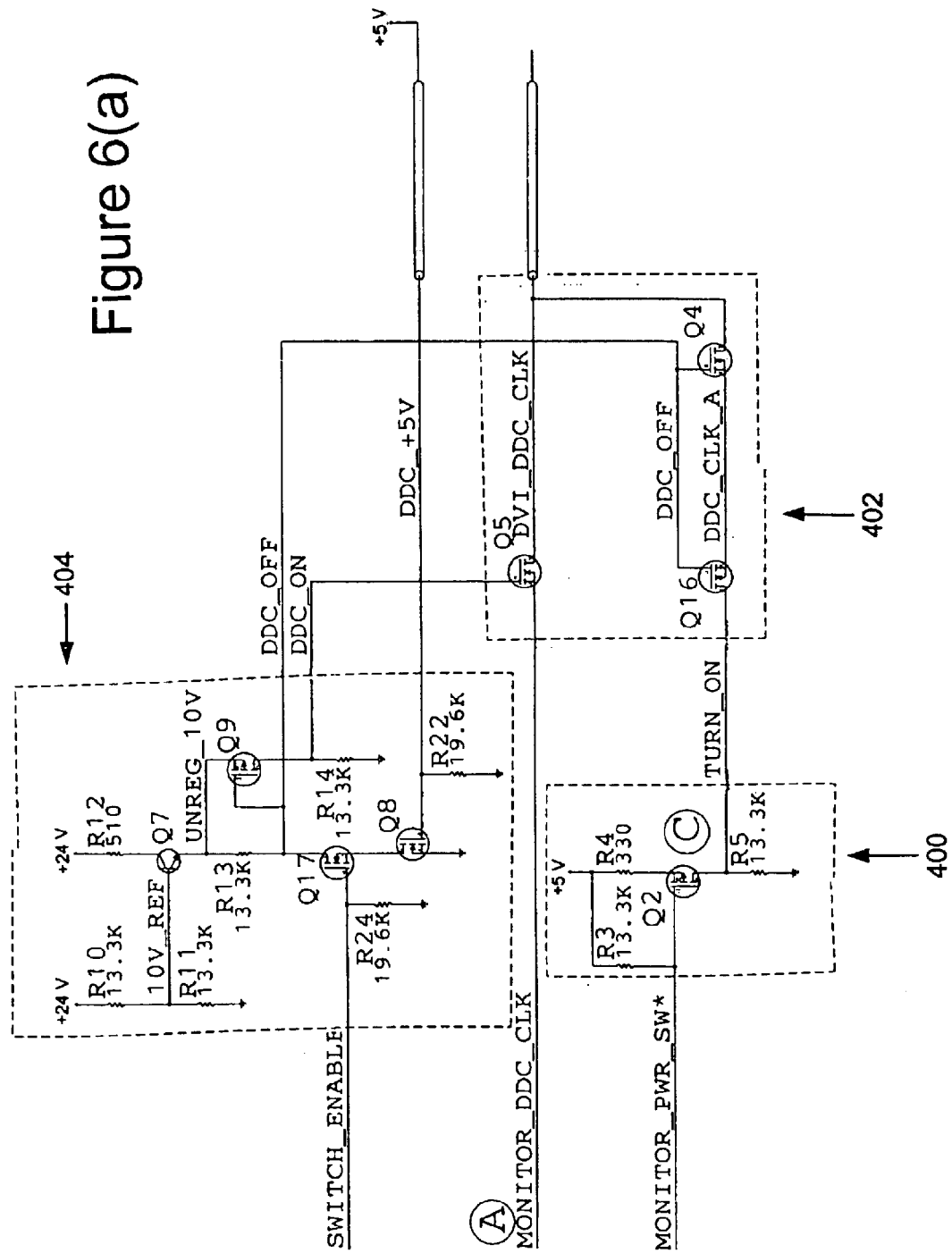

US 6,734,579 B1

SYSTEM AND METHOD FOR ACTIVATING A FIRST DEVICE FROM A SECOND DEVICE

BACKGROUND

1. Technical Field

The present invention relates to electronic devices, and more particularly to techniques for transmitting information concerning a second electronic device to a first electronic device. Still more particularly, the present invention relates to a system and method for activating a first device from a second device.

2. Description of the Prior Art

Modern electronic devices, such as computing systems, strive to offer a variety of features to users. Some of these features are standard features known and used in a particular industry, while others are unique and differentiate a particular product or manufacturer from its competitors. One example of a feature offered in some computing systems is the ability to turn on, or place in an increased power state, a first device from a second device. For example, turning on a display screen may also turn on a computing device, such as a laptop or desktop computer, connected to that display screen.

Another feature that may be offered in some computing systems is the ability to have multiple display screens connected to a computing device. The display screens may be connected to the computing device using one or more connection techniques. For example, the connection means may be unique to a manufacturer. Other connection techniques may include connectors or ports having predefined functions. The predefined functions may be defined by an individual manufacturer or designer, or by a standards organization. A government, administrative department, technical, or industry group are examples of standards organizations that may define the functions and/or signals that create a particular standard.

One limitation with using a connection comprised of signals having predefined functions is that additional features not defined in the standard may be lost. A manufacturer may not be able to implement any additional features since there may not be any free, or unused, signal lines available in the connection. Thus, features that a user may expect with a particular product and/or manufacturer may be lost when a system uses a connection technique having predefined functions.

SUMMARY

A signaling circuit may be implemented with a connection comprised of signal lines having predefined functions. The predefined functions may be defined by an individual manufacturer or designer, or by a standards organization. The signaling circuit transmits information not included in the predefined functions. The information may be transmitted from a second device, such as a visual display screen, to a first device, such as a computing device, using at least one signal line in the connection. The information may include information about the state or status of the second device.

In an exemplary embodiment of the present invention, the signaling circuit may or turn on, or put the first device in an increased power state when a switch associated with the second device is asserted. In the exemplary embodiment, at least one signal line, such as a unidirectional signal line, may transmit a signal from the first device to the second device in its predefined function. This unidirectional signal line may be utilized in the exemplary embodiment to activate the first device by transmitting a signal from the second device to the first device. Once the first device is activated, the signaling circuit may be disabled in order to allow the at least one signal line to be used for its predefined function.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

FIG. 2 is a block diagram depicting a second embodiment of a system that may be used to implement the present invention;

FIGS. 6(a)–6(b) are circuit diagrams of an exemplary signaling circuit according to the present invention;

DETAILED DESCRIPTION

To facilitate an understanding of the present invention, it is described hereinafter in the context of a specific embodiment. In particular, reference is made to the implementation of the invention in a computing system utilizing a connection or port having predefined functions. The computing system includes a computing device connected to a display screen through a Digital Visual Interface (DVI) connection or port. It will be appreciated, however, that the practical applications of the invention are not limited to this particular embodiment. Rather, the invention can be employed to signal other information in other types of electronic devices and systems, including, but not limited to, broadcast systems, network structures, and electronic devices that utilize one or more connections or ports having signal lines with predefined functions.

Figure 1:
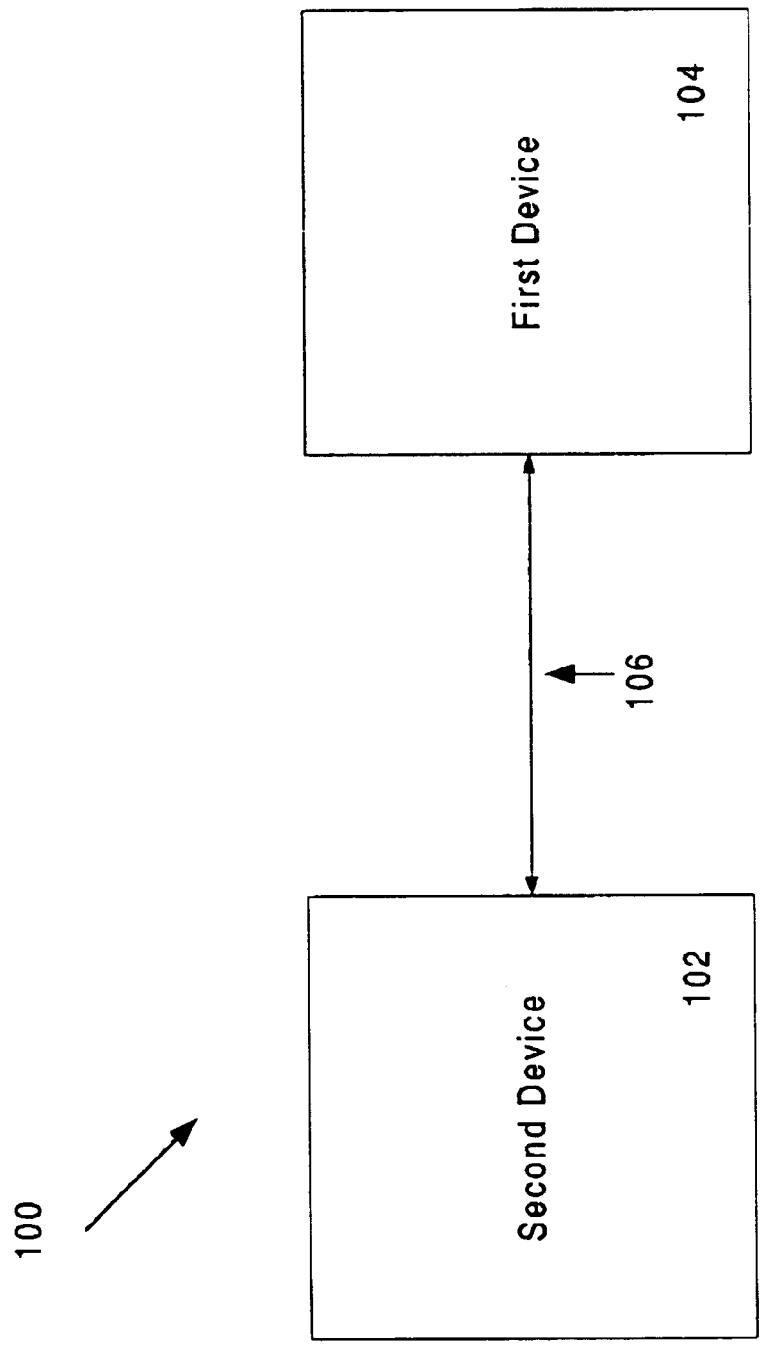
FIG. 1 is a block diagram illustrating a first embodiment of a system that may be used to implement the present invention.

With reference now to the figures and in particular with reference to FIG. 1, a block diagram illustrates a first embodiment of a system that may be used to implement the present invention. System 100 may include, but is not limited to, a second device 102 electronically connected to a first device 104 via connection 106. In an exemplary embodiment, the second device may be implemented as a visual display screen and the first device may be implemented as a computing device. Connection 106 may include signal lines having predefined signals and/or functions. The predefined signals and/or functions may be defined by an individual manufacturer or designer, or by a standards organization. In this exemplary embodiment, connection 106 may be implemented as a Digital Visual Interface (DVI) connection. In alternate embodiments, system 100 may be implemented using various components and configurations in addition to, or instead of, those discussed in conjunction with the FIG. 1 embodiment.

FIG. 2 is a block diagram depicting a second embodiment of a system that may be used to implement the present invention. System 200 may include, but is not limited to, an adapter 202 electronically connected to a second device 204 and to a first device 104. In the FIG. 2 embodiment, the second device may be implemented as a visual display screen and the first device may be implemented as a computing device. In alternate embodiments, system 200 may be implemented using various components and configurations in addition to, or instead of, those discussed in conjunction with the FIG. 2 embodiment.

Figure 3A:
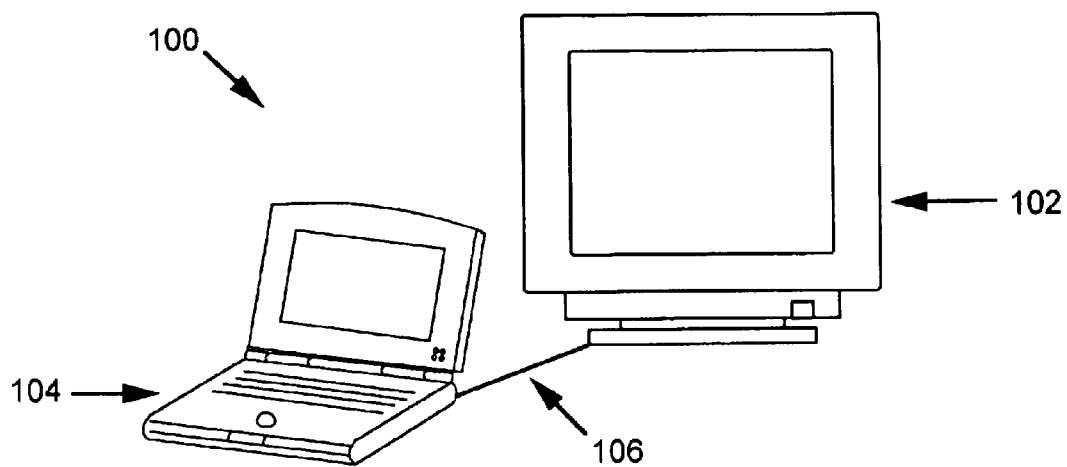
FIG. 3a illustrates an exemplary system as shown in FIG. 1.

Referring now to FIG. 3a, an exemplary system from FIG. 1 is shown. System 100 may include, but is not limited to, a visual display screen 102 electronically connected to a computing device 104 via connection 106. Visual display screen 102 may be implemented as a digital display, such as a Liquid Crystal Display (LCD) or plasma display. Alternatively, visual display screen 102 may be implemented as an analog display, such as a cathode-ray-tube (CRT) display. Computing device 104 may be implemented as a portable or desktop computer. And connection 106 may be implemented as a Digital Visual Interface (DVI) connection. In alternate embodiments, system 100 may be implemented using various components and configurations in addition to, or instead of, those discussed in conjunction with the FIG. 3a embodiment.

Figure 3B:
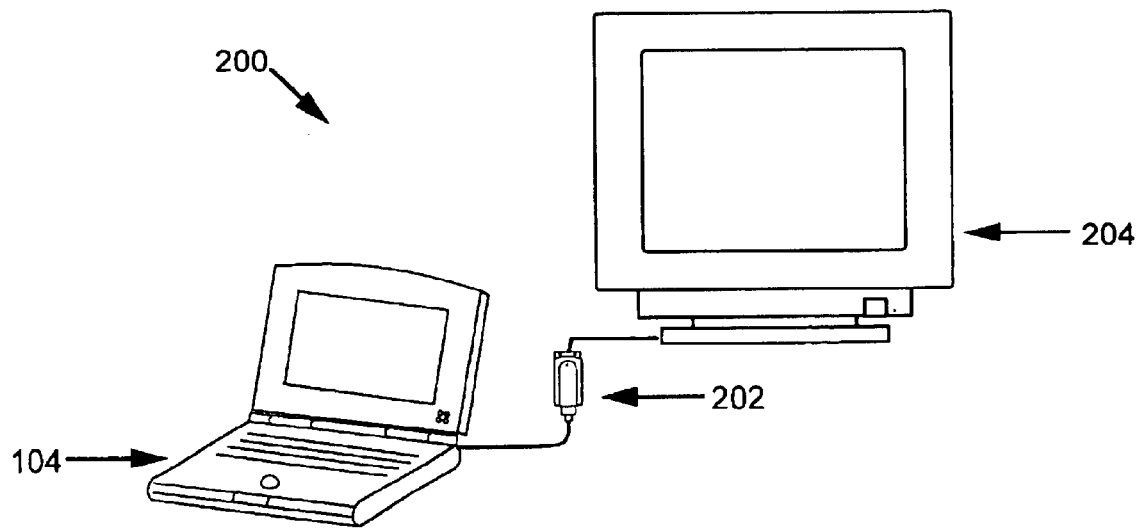
FIG. 3b depicts an exemplary system 200 as shown in FIG. 2.

FIG. 3b depicts an exemplary system 200 as shown in FIG. 2. System 200 may include, but is not limited to, an adapter 202 electronically connected to a visual display screen 204 and to a computing device 104. Visual display screen 204 may be implemented as a digital or analog display screen. Computing device 104 may be implemented as a portable or desktop computer. Adapter 202 may be implemented as a DVI adapter, such as the DVI to ADC Adapter sold by Apple Computers®. In alternate embodiments, system 200 may be implemented using various components and configurations in addition to, or instead of, those discussed in conjunction with the FIG. 3b embodiment.

Figure 4:
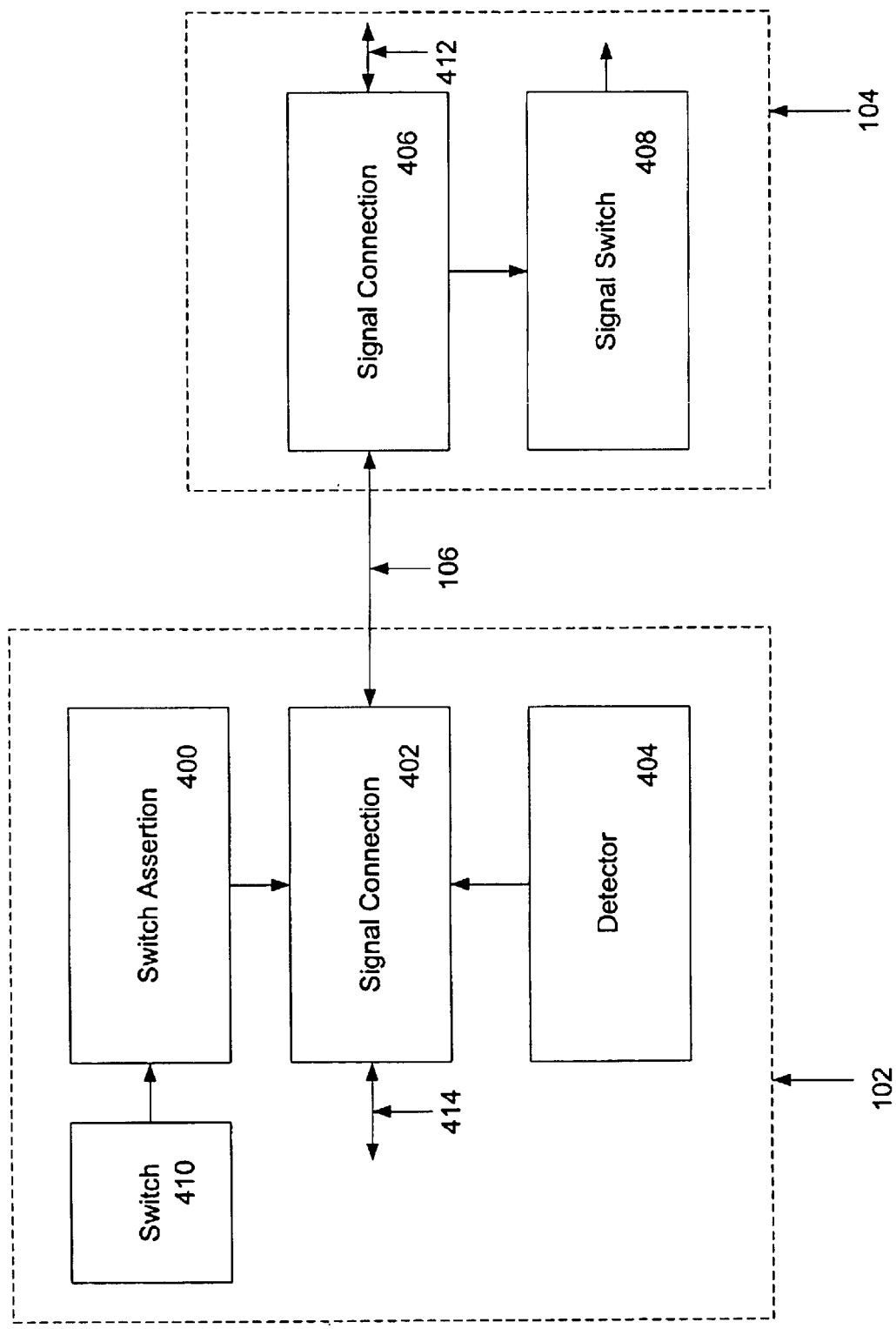
FIG. 4 is a block diagram illustrating an exemplary signaling circuit according to the present invention.

Referring now to FIG. 4, a block diagram illustrates an exemplary signaling circuit according to the present invention. Second device 102 may include, but is not limited to, a switch assertion 400, a signal connection 402, a detector 404, and a switch 410. First device 104 may include, but is not limited to, a signal connection 406 and a signal switch 408. In alternate embodiments, first and second devices may be implemented using various components and configurations in addition to, or instead of, those discussed in conjunction with the FIG. 4 embodiment.

In this exemplary embodiment, detector 404 may be used to detect whether first device 104 is in an "on" or "off" state. The "off" state includes any low or no power state, including a sleep state and a turned off (i.e., no power) state. If first device 104 is in an "off" state, switch assertion 400 may generate or alter a first signal when switch 410 is pressed or asserted. The second device 102 may or may not respond to the assertion of switch 410. In this exemplary embodiment, asserting switch 410 may also activate second device 102. The term "activate" is defined herein as an increased power state, including, but not limited to, a wake state and an on (i.e., full power) state. At least one predefined signal line in connection 106 may then be utilized to transmit this information to first device 104 in order to activate first device 104.

Signal connection 402 may receive the first signal generated by switch assertion 400, and in response, may generate or alter a second signal to indicate switch 410 has been pressed or asserted. The second signal may then be transmitted to signal connection 406 in first device 104 via at least one signal line in connection 106. If the second signal indicates switch 410 has been pressed or asserted, signal connection 406 may generate or alter a third signal that may be sent to signal switch 408 in order to signal first device 104. In this exemplary embodiment, signal switch 408 may generate a signal to initiate activation of first device 104.

Once first device 104 is activated, signal connection 402 and signal connection 406 may be enabled to allow a connection between second device 102 and first device 104 via connection 106 and lines 412 and 414. Additionally, signal switch 408 and switch assertion 400 may be disabled and isolated in order to allow the signal lines in connection 106 to operate in their predefined manner.

Figure 5:
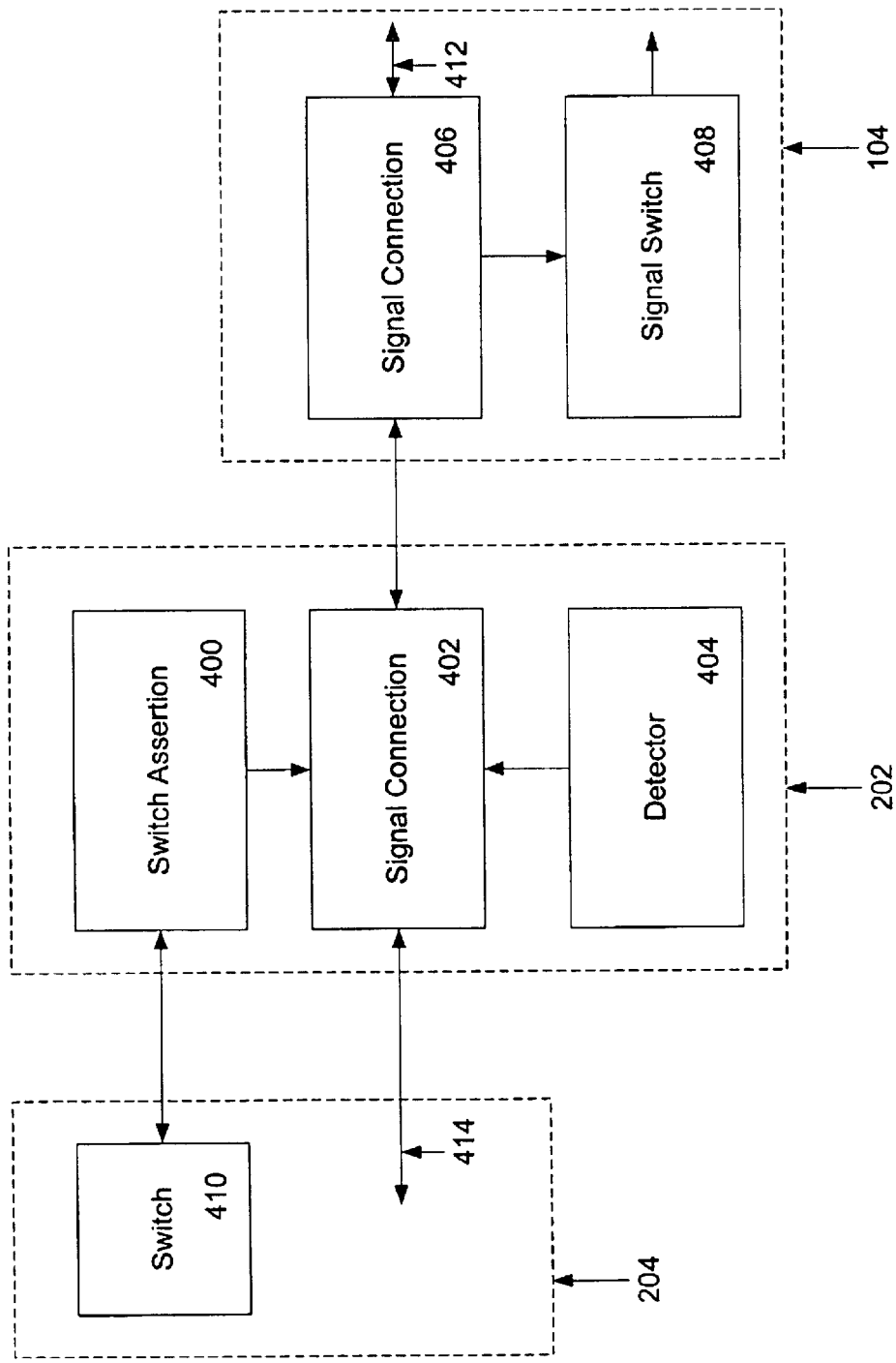
FIG. 5 is a block diagram depicting an alternate exemplary signaling circuit according to the present invention.

FIG. 5 is a block diagram depicting an alternate exemplary signaling circuit according to the present invention. Adapter 202 may include, but is not limited to, a switch assertion 400, a signal connection 402, and a detector 404. Second device 204 may include, but is not limited to, a switch 410. And first device 104 may include, but is not limited to, a signal connection 406 and a signal switch 408. The various components in adapter 202, second device 204, and first device 104, may operate in a manner similar to the components described with reference to FIG. 4. However, in alternate embodiments, adapter, first device, and second device may be implemented using various components and configurations in addition to, or instead of, those discussed in conjunction with the FIG. 5 embodiment.

Figure 6B:
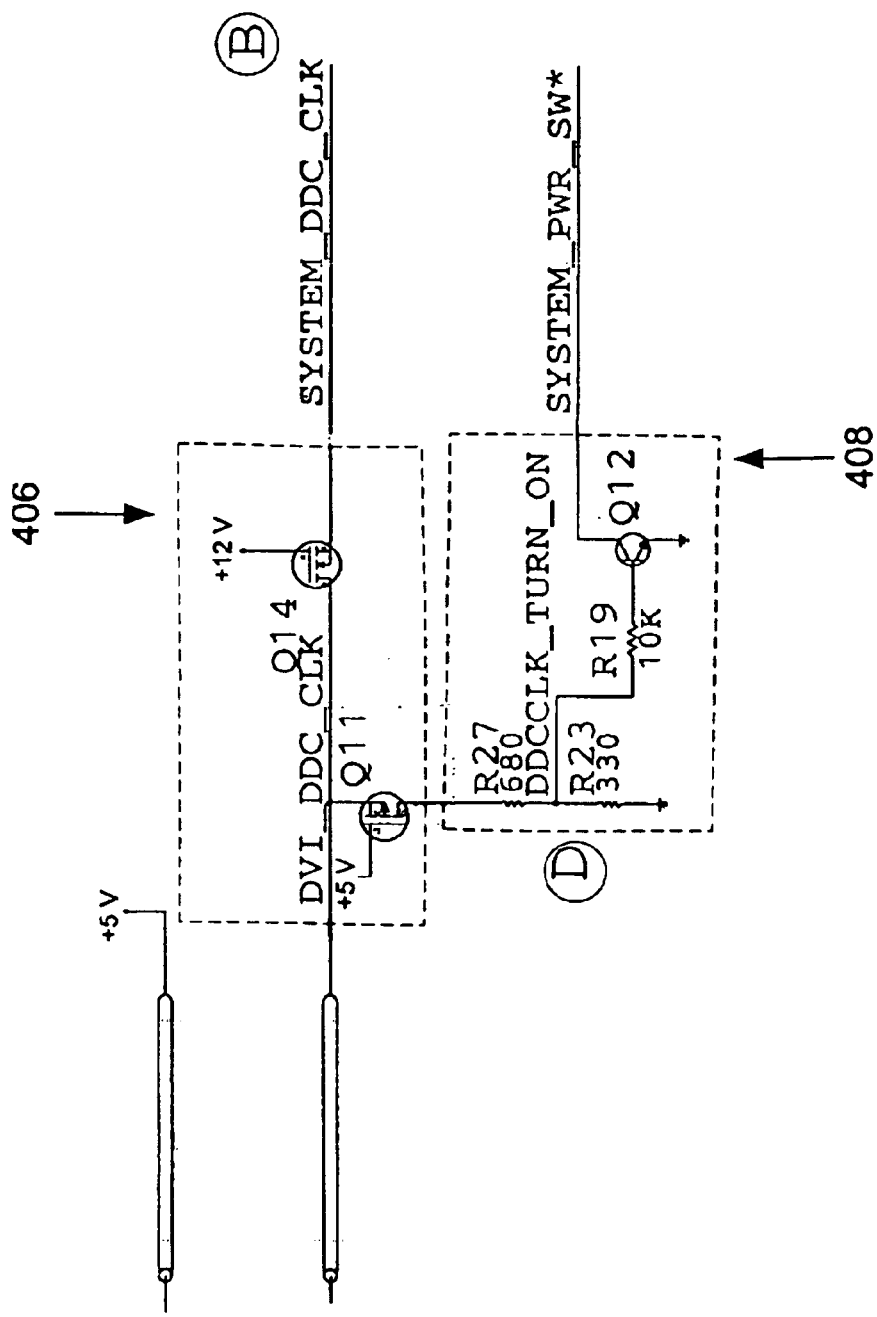

Referring now to FIGS. 6(a)–6(b), circuit diagrams of an exemplary signaling circuit according to the present invention are shown. The FIG. 6 example is presented for purposes of illustration, and in alternate embodiments, the present invention may utilize various components and component values other than those discussed in conjunction with the FIG. 6 embodiment. The operation of the exemplary signaling circuit will be described in conjunction with the timing diagram in FIG. 7.

Detector 404 may detect whether or not first device 104 is in an "on" or "off" state. If first device 104 is on, transistor Q5 in signal connection 402 may be turned on while transistors Q4 and Q16 are turned off. This may connect electronically node "A" with node "B", thereby establishing a connection between first device 104 and second device 102.

If, however, first device 104 is in an "off" state, a signal DVI_DDC_CLK may be isolated electronically from both the first and second devices 102, 104. In particular, in the FIG. 6 embodiment, isolation of the DVI_DDC-CLK signal may be accomplished via transistor Q5 within signal connection 402 and transistor Q14 within signal connection 406. The signal DVI_DDC_CLK may then be used to signal, or transmit information, to first device 104 from second device 102. In this exemplary embodiment, the information may include information to activate first device 104.

Connection 106 may be implemented pursuant to the Digital Visual Interface (DVI) standard in this exemplary embodiment. In the DVI specification, the signal DVI_DDC_CLK is implemented as a unidirectional signal from first device 104 to second device 102. Using a unidirectional signal can prevent unintended power-on events in first device 104. When first device 104 and second device 102 are in an "off" state, transistor Q4 within signal connection 402 may connect the isolated DVI_DDC_CLK signal to the node "C" in switch assertion 400 and to node "D" in signal switch 406.

When a switch associated with the second device 102 is pressed or asserted, a signal Monitor_Pwr_Sw* may transition to a low state (see point 700 in FIG. 7) and turn on transistor Q2 within switch assertion 400. The signal TURN_ON, located at node "C", may then transition to a high state in response to Monitor-Pwr_Sw* transitioning to a low state (see point 702 in FIG. 7). When signal TURN_ON is in a high state, signal TURN_ON may pass through transistors Q4 and Q16 within signal connection 402. When this happens, the signal DVI_DDC_CLK may transition to a high state (point 704 in FIG. 7) and propagate through connection 106 to transistor Q11 within signal connection 406. Transistor Q11 may then turn on, causing the signal DDCCLK_TURN_ON at node "D" to transition to a high state (see point 706 in FIG. 7). When transistor Q11 is on, transistor Q12 within signal switch 408 may then turn on, causing a signal SYSTEM_PWR_SW* to transition to a low state (point 708 in FIG. 7). In this exemplary embodiment, signal SYSTEM_PWR_SW* may be used to initiate activation of first device 104.

Node "D" may be isolated electronically from second device 102 by raising the voltage at the gate of transistor Q11 to five volts in the FIG. 6 embodiment. Thus, transistor Q11 may not turn on for any signal of five volts or less, effectively isolating transistor Q12 from initiating any further activation events for first device 104. In particular, signal DDCCLK_TURN_ON at node "D" may transition to a low state, causing SYSTEM_PWR_SW* to transition to a high state, as shown at points 710 and 712 in FIG. 7. In this exemplary embodiment, a signal initiating activation of first device 104 may not be generated when SYSTEM_PWR_SW* is in a high state.

Figure 7:
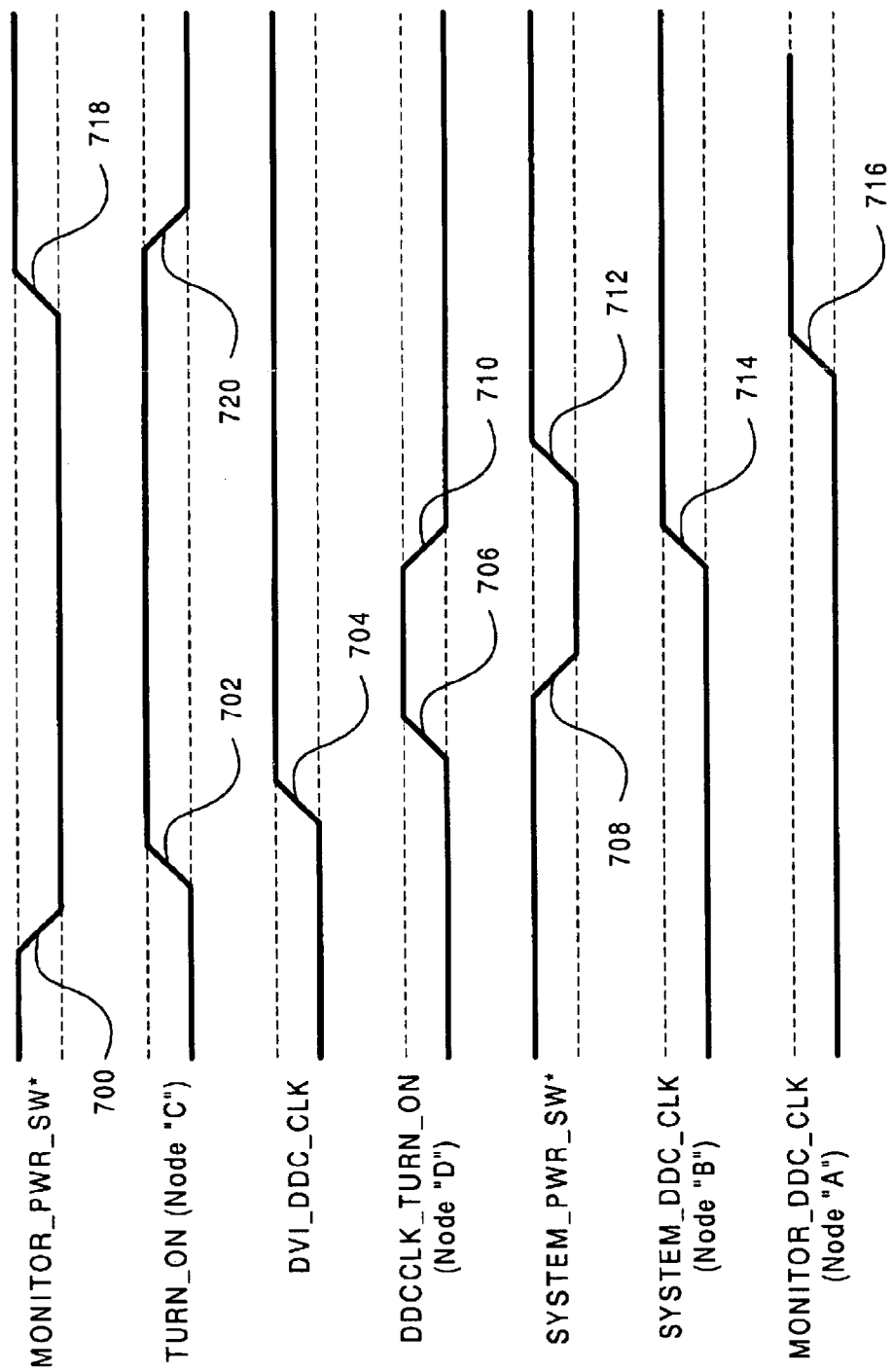
FIG. 7 is a timing diagram for certain signals in the exemplary signaling circuit of FIG. 6.

Shortly after SYSTEM_PWR_SW* transitions to a low state in order to activate first device 104, a signal SYSTEM_DDC_CLK at node "B" and a signal MONITOR_DDC_CLK at node "A" transition to a high state (see points 714 and 716 in FIG. 7). In particular, transistors Q5 and Q14 may be turned on and connect electronically node "A" and node "B". In this exemplary embodiment, the gates of transistors Q5 and Q14 may be pulled up to ten volts or greater, thereby rendering transistors Q5 and Q14 invisible to normal circuit operations.

When nodes "A" and "B" are connected, the signal MONITOR_PWR_SW* may transition back to a high state, as shown at point 718. The signal TURN_ON at node "C" may then transition to a low state, turning off transistor Q4. This may isolate electronically switch assertion 400 from second device 102. Isolating both switch assertion 400 and signal switch 408 may disable the signaling circuit and allow the DVI_DDC_CLK signal to be used for its predefined function.

Figure 8:
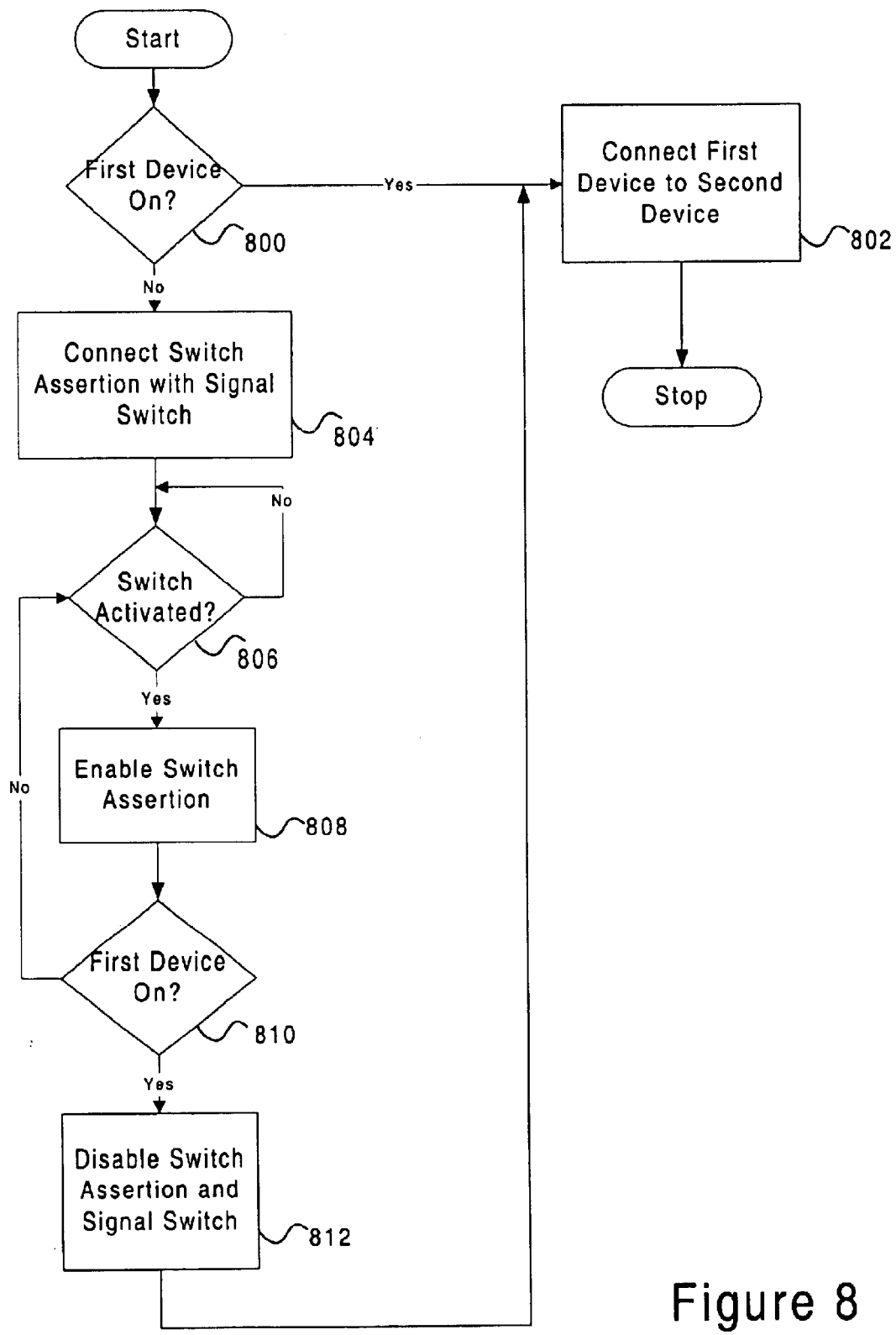
FIG. 8 is a flowchart illustrating an exemplary method for signaling a first device from a second device according to the present invention.

FIG. 8 is a flowchart illustrating an exemplary method for signaling a first device from a second device according to the present invention. The FIG. 8 example is presented for purposes of illustration, and in alternate embodiments, the present invention may utilize various steps and sequences other than those discussed in conjunction with the FIG. 8 embodiment.

Initially a determination may be made as to whether or not first device 104 is in an "on" or "off" state, as shown in block 800. If first device 104 is in an "on" state, the process may pass to block 802 where nodes "A" and "B" in FIG. 6 may be connected electronically. In other words, transistors Q5 and Q14 in FIG. 6 may be turned on so that second device 102 may be connected electronically to first device 104 via connection 106.

If, however, first device 104 is in an "off" state, the process may pass to block 804 where nodes "A" and "B" are isolated electronically from one another by having transistor QS in signal connection 402 and transistor Q14 in signal connection 406 turned off. Switch assertion 400 may now be connected to signal switch 406. In particular, in the FIG. 6 embodiment, nodes "C" and "D" may be connected electronically to one another.

A determination may then be made as to whether or not a switch associated with second device 102 has been pressed or asserted (block 806). If the switch has not been asserted, the process waits until the switch is asserted. When the switch associated with second device 102 is pressed or asserted, the process may then continue at block 808 where switch assertion 400 may be enabled. In the exemplary embodiment of FIG. 6, switch assertion 400 may be enabled by turning on transistor Q2. This in turn may enable signal switch 408 and initiate a power on or power up event in first device 104.

A determination may then be made at block 810 as to whether or not first device 104 is activated. If not, the process may return to block 806 and repeat until the first device is turned on. When the first device is activated, the process may pass to block 812 where switch assertion 400 and signal switch 408 may be disabled. In particular, nodes "C" and "D" may be disconnected electronically from one another. Disabling switch assertion 400 and signal switch 408 allows the connection to operate in its predefined manner.

The process may then continue at block 802 where nodes "A" and "B" in FIG. 6 may be connected electronically. In other words, first device 104 may be turned on and connected electronically to second device 102 through connection 106.

Figure 9:
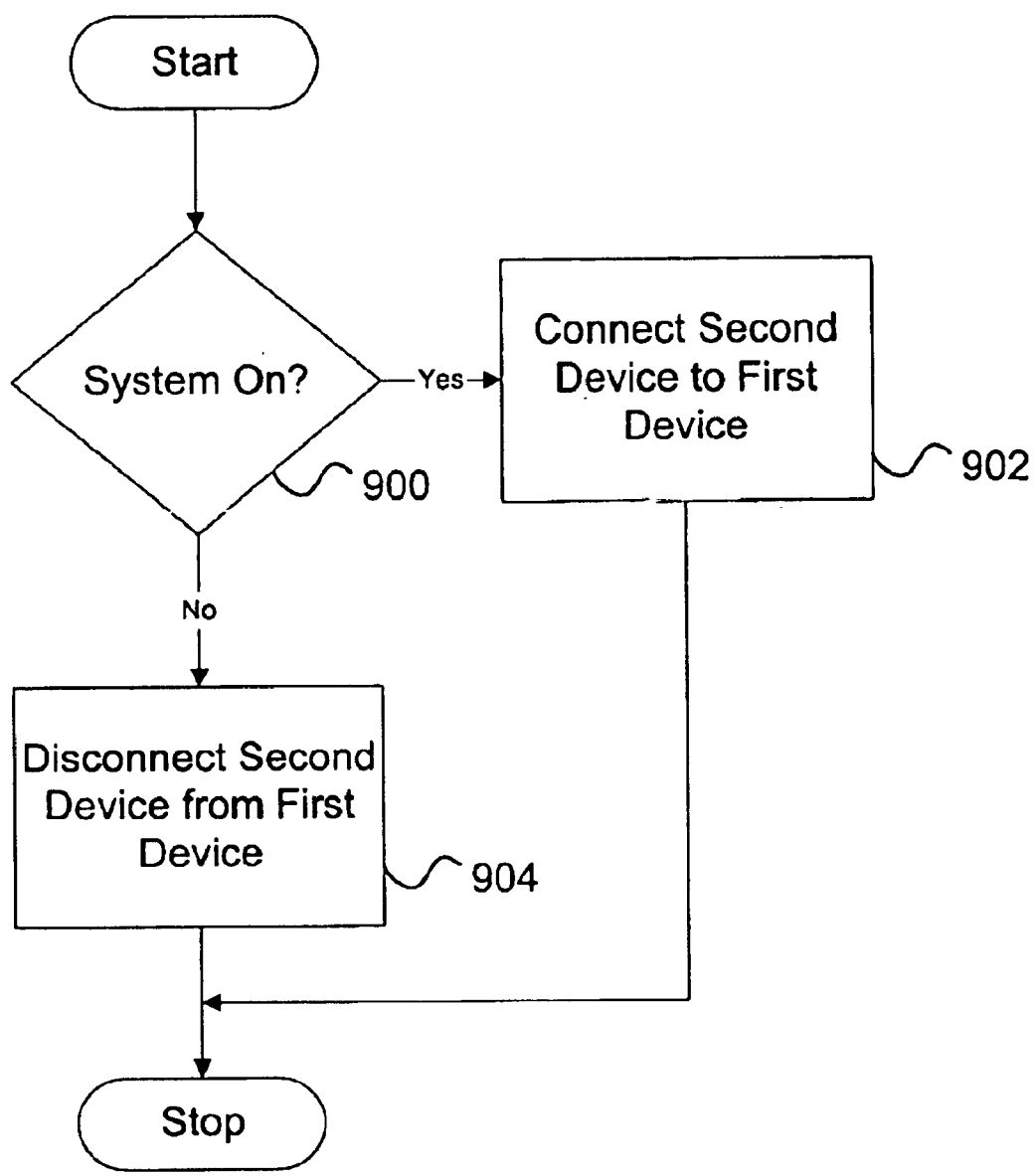
FIG. 9 is a flowchart depicting an alternate exemplary method for signaling a first device from a second device according to the present invention.

Referring now to FIG. 9, a flowchart depicts an alternate exemplary method for signaling a first device from a second device according to the present invention. The FIG. 9 example is presented for purposes of illustration, and in alternate embodiments, the present invention may utilize various steps and sequences other than those discussed in conjunction with this embodiment. The process of FIG. 9 may be implemented when a first device does not include the components shown in first device 104, but a second device does include the components shown in second device 102 in FIG. 4. Thus, in this exemplary embodiment, pressing or asserting a switch associated with the second device when the first device is in an "off" state will not activate the first device.

Initially a determination may be made as to whether or not the first device is in an "on" state (block 900). If the first device is on, the process may pass to block 902 where nodes "A" and "B" may be connected electronically to one another. If, however, the first device is not on, the process may continue at block 904 where nodes "A" and "B" may be disconnected electronically. Since the first device does not include signal connection 406 and signal switch 408, pressing or asserting the switch associated with second device 104 will not activate the first device.

Figure 10:
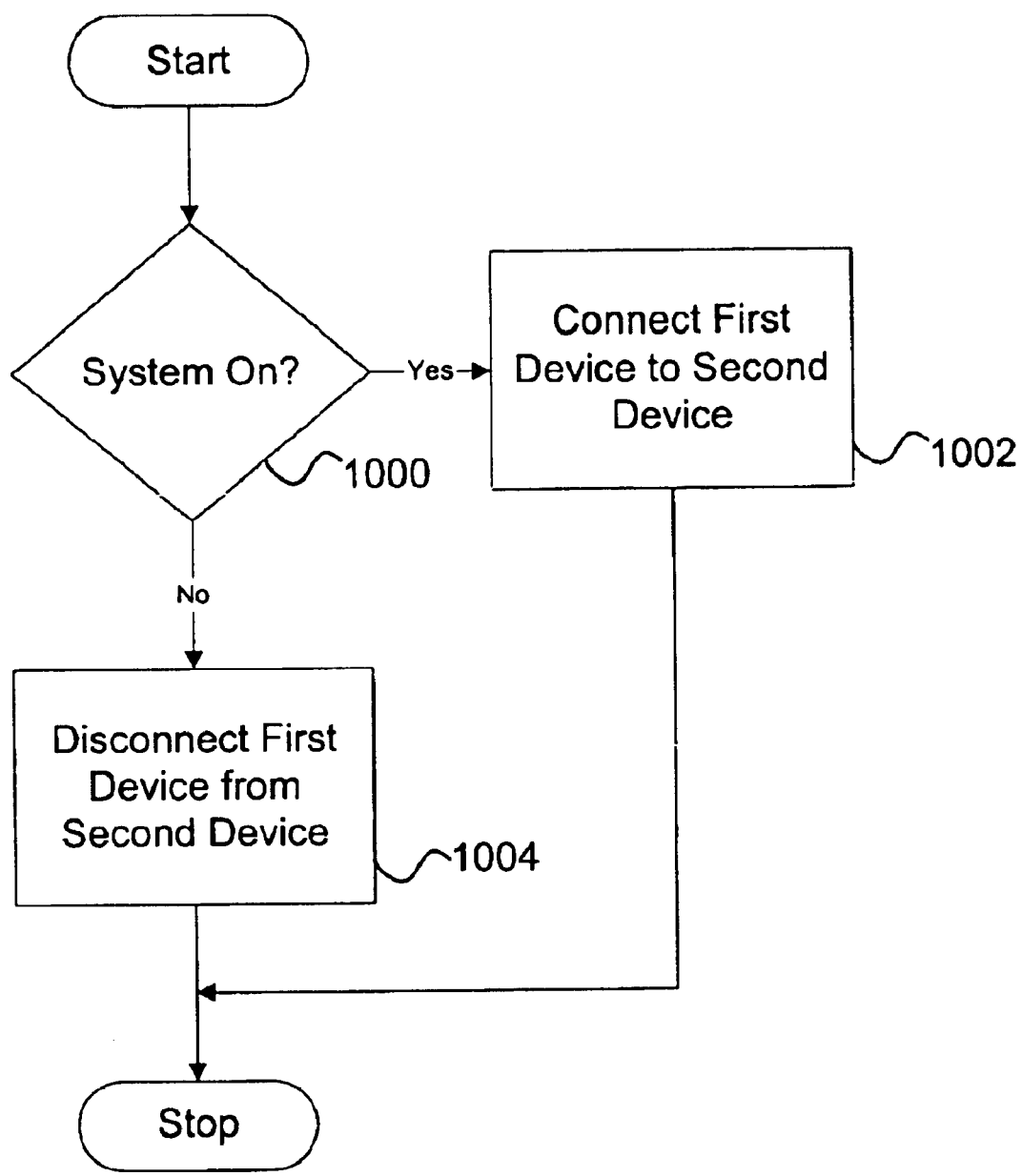
FIG. 10 is a flowchart illustrating an alternate method for signaling a first device from a second device according to the present invention.

FIG. 10 is a flowchart illustrating an alternate method for signaling a first device from a second device according to the present invention. The example shown in FIG. 10 is presented for purposes of illustration, and in alternate embodiments, the present invention may utilize various steps and sequences other than those discussed in conjunction with this embodiment. The process of FIG. 10 may be implemented when a second device does not include the components shown in second device 102, but a first device does include the components shown in first device 104 in FIG. 4. Thus, in this exemplary embodiment, pressing or asserting a switch associated with the second device when the first device is in an "off" state will not activate first device 104.

Initially a determination may be made as to whether or not the first device is in an "on" state (block 1000). If the first device is on, the process may pass to block 1002 where nodes "A" and "B" may be connected electronically to one another. If, however, the first device is in an "off" state, the process may continue at block 1004 where nodes "A" and "B" may be disconnected electronically. Since the second device does not include switch assertion 400 and signal connection 402, pressing or asserting the switch associated with the second device will not activate first device 104.

Thus, the present invention provides a mechanism for signaling a first device from a second device using at least one predefined signal line in a connection between two electronic devices. While the invention has been particularly shown and described with reference to an exemplary embodiment, it will be understood by those skilled in the art that various changes in form and detail may be made therein without departing from the spirit and scope of the invention. For example, the present invention has been described with reference to activating the first device from the second device when a switch associated with the second device is asserted. The invention, however, is not limited to this function. The present invention may be used to signal any information not included in the predefined signals and/or functions. For example, the state or status of a particular device or a system may be transmitted to another device using the techniques of the present invention. Additionally, actions or functions other than asserting a switch may be used to signal information to the first device.

What is claimed is:

1. A method for signaling a first device from a second device using a connection comprised of signal lines with predefined functions, the method comprising:

connecting electronically a first circuit in the second device with a second circuit in the first device using the connection comprised of signal lines with predefined functions, wherein the first circuit generates a signal representing information to be transmitted to the second circuit and the information is not included in the predefined functions;

transmitting the signal to the second circuit in the first device using at least one signal line in the connection; and disconnecting electronically the first circuit from the second circuit in order to allow the at least one signal line to be used for its predefined function.

2. The method of claim 1, further comprising the step of detecting whether the first device can receive the signal.

3. The method of claim 2, wherein the first device is comprised of a computing device and the second device is comprised of a visual display screen.

4. The method of claim 3, wherein the step of detecting whether the computing device can receive the signal comprises the step of detecting whether the computing device is in an "on" or "off" state.

5. The method of claim 4, wherein the first circuit generates a signal that activates the computing device when a switch associated with the visual display screen is asserted and the computing device is in an "off" state.

6. The method of claim 1, wherein the first device is comprised of a computing device and the second device is comprised of an adapter.

7. A system for signaling a first device from a second device using a connection comprised of signal lines with predefined functions, the system comprising:

means for connecting electronically a first circuit in the second device to a second circuit in the first device using the connection comprised of signal lines with predefined functions, wherein the first circuit generates a signal representing information to be transmitted to the second circuit and the information is not included in the predefined functions;

means for transmitting the signal to the second circuit in the first device using at least one signal line in the connection; and means for disconnecting electronically the first circuit from the second circuit in order to allow the at least one signal line to be used for its predefined function.

8. The system of claim 7, further comprising means for detecting whether the first device can receive the signal.

9. The system of claim 8, wherein the first device is comprised of a computing device and the second device is comprised of a visual display screen.

10. The system of claim 9, wherein the means for detecting whether the first device can receive the signal comprises the step of detecting whether the computing device is in an "on" or "off" state.

11. The system of claim 10, further comprising means for activating the computing device.

12. The system of claim 11, wherein the first circuit generates a signal that enables the means for activating the computing device when a switch associated with the visual display screen is asserted and the computing device is in an "off" state.

13. The system of claim 7, wherein the first device is comprised of a computing device and the second device is comprised of an adapter.

14. A signaling circuit for signaling a first device from a second device using a connection comprised of signal lines with predefined functions, the signaling circuit comprising:

a switch assertion circuit for generating a signal when a switch associated with the second device is asserted, wherein the signal is not included in the predefined functions associated with the connection;

a signal switch circuit for generating a signal to activate the first device; and a signal connection circuit connected electronically to the switch assertion circuit and to the signal switch circuit to transmit the signal generated by the switch assertion circuit to the signal switch circuit using at least one signal line in the connection, wherein the signal switch circuit generates the signal to activate the first device in response to receiving the signal generated by the switch assertion circuit.

15. The signaling circuit of claim 14, further comprising means for disconnecting electronically the switch assertion circuit from the signal switch circuit once the first device is activated in order to allow the at least one signal line to be used for its predefined function.

16. The signaling circuit of claim 14, further comprising a detector circuit for detecting if the first device is in an "on" or "off" state.

17. The signaling circuit of claim 16, wherein the first device is comprised of a computing device and the second device is comprised of a visual display screen.

18. The signaling circuit of claim 17, wherein the switch assertion circuit generates the signal when the switch associated with the second device is asserted and the first device is in an "off" state.

19. The signaling circuit of claim 18, wherein the switch associated with the visual display screen is asserted in order to turn on the visual display screen.

20. The signaling circuit of claim 16, wherein the first device is comprised of a computing device and the second device is comprised of an adapter.

21. A first device for activating a second device connected to the first device through a connection comprised of signal lines having predefined functions, comprising:

a switch assertion circuit for generating a signal when a switch associated with the first device is asserted, wherein the signal is not included in the predefined functions associated with the connection; and a signal connection circuit connected electronically to the switch assertion circuit to transmit the signal generated by the switch assertion circuit using at least one signal line in the connection, wherein the signal initiates activation of the second device.

22. The first device of claim 21, further comprising means for disabling the switch assertion circuit once the second device has been activated in order to allow the at least one signal line to be used for its predefined function.

23. The first device of claim 21, wherein the second device is comprised of a computing device.

24. The first device of claim 23, wherein the first device is comprised of a visual display screen.

25. The first device of claim 23, wherein the first device is comprised of an adapter.

26. A first device for receiving an activation signal from a second device through a connection comprised of signal lines having predefined functions, wherein the activation signal initiates activation of the first device, the first device comprising:

a signal connection circuit for receiving the activation signal on at least one signal line in the connection after a switch associated with the second device is asserted and, in response, generating the activation signal, wherein the activation signal is not included in the predefined functions associated with the connection; and a signal switch circuit connected electronically to the signal connection circuit to initiate activation of the first device in response to receiving the activation signal.

27. The first device of claim 26, further comprising means for disabling the signal switch circuit once the first device has been activated in order to allow the at least one signal line in the connection to be used for its predefined function.

28. The first device of claim 26, wherein the first device is comprised of a computing device.

29. The first device of claim 28, wherein the second device is comprised of an adapter.

30. The first device of claim 28, wherein the second device is comprised of a visual display screen.

31. A method for activating a first device from a second device using a connection comprised of signal lines with predefined functions, the method comprising:

determining whether the first device is in an "off" state;

if the first device is in an "off" state, connecting electronically a switch assertion circuit associated with the second device to a signal switch circuit associated with the first device;

determining whether a switch associated with the second device has been asserted;

if the switch has been asserted, enabling the switch assertion circuit to generate a signal that is transmitted to the signal switch circuit using at least one signal line in the connection, wherein the signal initiates activation of the first device; and disabling the switch assertion circuit and the signal switch circuit so that the at least one signal line is used for its predefined function.

* * * * *